US009110786B2

(12) United States Patent
Carlson et al.

(10) Patent No.: US 9,110,786 B2
(45) Date of Patent: Aug. 18, 2015

(54) READ OPERATION PRIOR TO RETRIEVAL OF SCATTER GATHER LIST

(71) Applicant: SANDISK TECHNOLOGIES INC., Plano, TX (US)

(72) Inventors: Marcus Allan Carlson, Santa Clara, CA (US); Shay Benisty, Be'er Sheva (IL)

(73) Assignee: SANDISK TECHNOLOGIES INC., Plano, TX (US)

(*) Notice: Subject to any disclaimer, the term of this patent is extended or adjusted under 35 U.S.C. 154(b) by 0 days.

(21) Appl. No.: 14/074,497

(22) Filed: Nov. 7, 2013

(65) Prior Publication Data
US 2015/0127882 A1 May 7, 2015

(51) Int. Cl.
G06F 13/00 (2006.01)
G06F 12/02 (2006.01)
G06F 13/10 (2006.01)
G06F 3/06 (2006.01)

(52) U.S. Cl.
CPC ............ *G06F 12/0246* (2013.01); *G06F 13/10* (2013.01); *G06F 3/067* (2013.01); *G06F 2212/7207* (2013.01)

(58) Field of Classification Search
CPC ................................ G06F 13/10; G06F 3/067
See application file for complete search history.

(56) References Cited

U.S. PATENT DOCUMENTS

| 6,886,074 | B1* | 4/2005 | Narayanaswamy et al. ... 711/114 |
| 7,840,657 | B2 | 11/2010 | Moore et al. |
| 2013/0047056 | A1 | 2/2013 | Hsu et al. |
| 2013/0086311 | A1* | 4/2013 | Huang et al. ................ 711/103 |

* cited by examiner

*Primary Examiner* — Zachary K Huson
(74) *Attorney, Agent, or Firm* — Toler Law Group, PC

(57) ABSTRACT

A data storage device includes a non-volatile memory and a controller coupled to the non-volatile memory. The controller is configured to receive a read command from a host device. The read command includes a starting logical block address (LBA) of the non-volatile memory, a number of logical blocks to be read (NLB), and a pointer to a scatter gather list (SGL). The controller is also configured to instruct the non-volatile memory to read a plurality of logical blocks from the non-volatile memory based on the starting LBA and the NLB. The controller is further configured to, after instructing the non-volatile memory to read the plurality of logical blocks, retrieve the SGL based on the pointer. The controller is configured to transfer a subset of the plurality of logical blocks identified by the SGL to the host device.

20 Claims, 3 Drawing Sheets

READ OPERATION PRIOR TO RETRIEVAL OF SCATTER GATHER LIST

FIELD OF THE DISCLOSURE

The present disclosure is generally related to reading data from memory of a data storage device.

BACKGROUND

Data storage devices, often referred to as "memory," are a fundamental building block of computer systems. Advances in technology have resulted in increasingly smaller data storage devices with increasingly larger data storage capacities. For example, an embedded data storage device may be used for data storage in portable devices, such as wireless telephones, tablet computers, etc. Because many of the operations performed by a data storage device are read operations or write operations, increasing the speed of read operations or write operations may provide significant performance benefits.

SUMMARY

Various standards and protocols regarding data storage devices have been promulgated by standards bodies and industry consortia. One standard associated with data storage devices is non-volatile memory express (NVMe). NVMe describes a standardized register level interface that enables communication between a host device and a data storage device that is compatible with peripheral component interconnect express (PCIe). NVMe may be particularly suitable for use with data storage devices that incorporate solid-state memory, such as NAND flash memory. According to NVMe, a host device may queue commands, such as read commands or write commands, for the data storage device. The data storage device may retrieve the commands from the queue(s) and execute the commands. Read commands and write commands may include (e.g., as parameters) information that enables the data storage device to execute the command. For example, a read command may identify, amongst other parameters, a memory address in the non-volatile memory from which data is to be read. The read command may include a pointer to a scatter gather list (SGL), where the SGL identifies logical blocks of data to be transferred to the host device. The SGL may also identify "bit buckets." A "bit bucket" is a set of logical blocks storing data that the host device has not requested. To illustrate, if a continuous sequence of logical blocks A, B, and C is stored in the data storage device and the host device requests logical blocks A and C in a read operation, the logical block B would be considered a "bit bucket" that the data storage device is to refrain from providing to the host device at the conclusion of the read operation.

The present disclosure describes systems and methods of performing a read operation, or at least a portion thereof, before retrieving and processing a scatter gather list (SGL). For example, a read command for a data storage device may include a starting logical block address (LBA), a number of logical blocks to be read (NLB), and a pointer to a SGL stored at a host device. Upon receiving the read command, a controller in the data storage device instructs non-volatile memory of the data storage device to read (e.g., pre-fetch) a continuous segment of logical blocks based on the starting LBA and the NLB. After instructing the non-volatile memory to read the logical blocks, the controller retrieves the SGL from the host device based on the pointer. The controller traverses the SGL to identify a subset of logical blocks that are to be provided to the host device, and transfers the subset of logical blocks to the host device. If the SGL identifies bit buckets, the bit buckets are not included in the subset (i.e., are not transferred to the host device). The described systems and methods may thus enable pre-fetching of data before retrieving and processing a SGL. Because the pre-fetch operation may be time consuming, starting the pre-fetch operation prior to SGL retrieval may decrease an overall read latency of the data storage device, even in cases where the pre-fetched data includes bit buckets that will subsequently be discarded.

In a particular embodiment, a data storage device that includes a controller and a non-volatile memory performs a method that includes receiving a read command from a host device. The read command includes a starting LBA of the non-volatile memory, a NLB, and a pointer to a SGL. The method also includes instructing the non-volatile memory to read a plurality of logical blocks from the non-volatile memory based on the starting LBA and the NLB. The method further includes after instructing the non-volatile memory to read the plurality of logical blocks, retrieving the SGL based on the pointer. The method includes transferring a subset of the plurality of logical blocks to the host device, where the subset is identified by the SGL.

In another particular embodiment, a data storage device includes a non-volatile memory and a controller coupled to the non-volatile memory. The controller is configured to receive a read command from a host device, wherein the read command includes a starting LBA of the non-volatile memory, a NLB, and a pointer to a SGL. The controller is also configured to instruct the non-volatile memory to read a plurality of logical blocks from the non-volatile memory based on the starting LBA and the NLB. The controller is further configured to, after instructing the non-volatile memory to read the plurality of logical blocks, retrieve the SGL based on the pointer. The controller is configured to transfer a subset of the plurality of logical blocks to the host device, where the subset is identified by the SGL.

DETAILED DESCRIPTION

Figure 1:
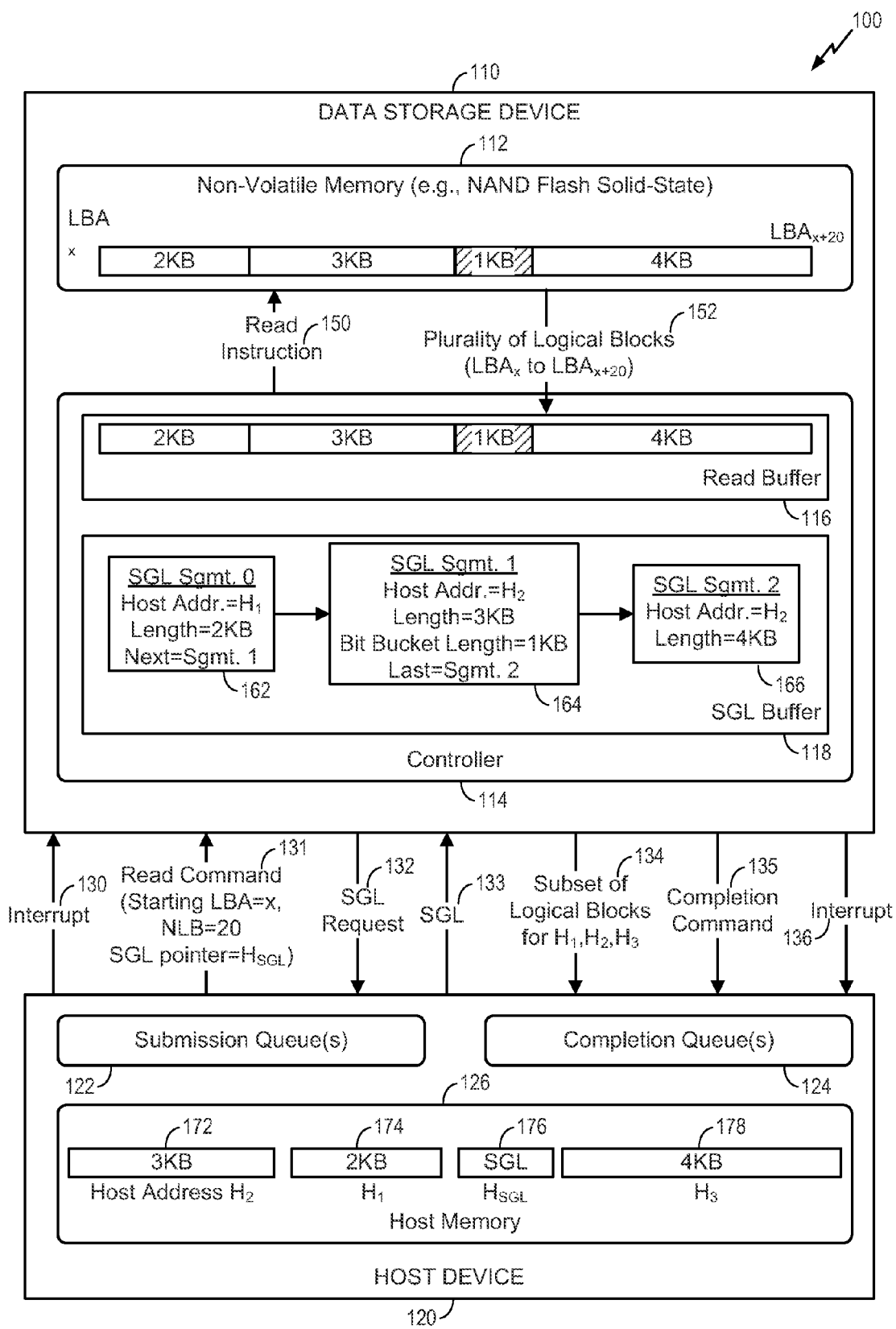
FIG. 1 is a block diagram of a particular illustrative embodiment of a system that is operable to initiate a read operation prior to retrieval of a scatter gather list (SGL)

Referring to FIG. 1, a particular embodiment of a system 100 includes a data storage device 110 coupled to a host device 120. The data storage device 110 is configured to initiate a read operation prior to retrieving a scatter gather list (SGL), as further described herein.

The data storage device 110 includes a non-volatile memory 112 coupled to a controller 114. For example, the non-volatile memory 112 may be a NAND flash solid-state memory. In a particular embodiment, the non-volatile memory 112 includes one or more groups of storage elements, such as word lines of a multi-level cell (MLC) flash memory, and each of the groups may include one or more storage elements, such as flash MLC cells. In a particular embodiment, the data storage device 110 is coupled to the host device 120 as embedded memory. As another example, the data storage device 110 may be a portable data storage device, such as a memory card, that can be removably coupled to the host device 120.

The controller 114 may include a read buffer 116 and a SGL buffer 118. The controller 114 is configured to receive data and commands from the host device 120 and to send data to the host device 120. The controller 114 is further configured to send data and instructions to the non-volatile memory 112 and to receive data from the non-volatile memory 112. For example, the controller 114 may send a read instruction 150 to the non-volatile memory 112 to read (e.g., pre-fetch) data (e.g., logical blocks 152) from a specified address range of the non-volatile memory 112 and to store the pre-fetched data in the read buffer 116. The controller 114 may also be configured to retrieve a SGL from the host device 120 and to store the retrieved SGL in the SGL buffer 118. It should be noted that although the read buffer 116 and the SGL buffer 118 are shown as being part of the controller 114, in alternate embodiments the read buffer 116 and the SGL buffer 118 may be external to the controller 114.

In an illustrative embodiment, the controller 114 may include additional components, such as an error correction code (ECC) engine to detect and correct errors in data stored in the non-volatile memory 112. Examples of ECC schemes that may be used include, but are not limited to, Reed Solomon, Bose-Chaudhuri-Hocquenghem (BCH), low-density parity check (LDPC), and Turbo Code.

The host device 120 is configured to provide data to be stored at the non-volatile memory 112 (e.g., as part of a write command) and to request data to be read from the non-volatile memory 112 (e.g., as part of a read command). In an illustrative embodiment, the host device 120 may include a mobile telephone, a music player, a video player, a gaming console, an electronic book reader, a personal digital assistant (PDA), a computer (e.g., a laptop computer, a desktop computer, a tablet computer, etc.), another electronic device, or any combination thereof. The host device 120 includes a host memory 126. For example, the host memory 126 may correspond to random access memory (RAM) of the host device 120.

In an illustrative embodiment, the data storage device 110 and the host device 120 communicate via a non-volatile memory express (NVMe) interface. The host device 120 may include one or more submission queues 122 to store NVMe commands (e.g., read commands and write commands) that are to be performed by the data storage device 110. The host device 120 may also include one or more completion queues 124 into which the data storage device 110 may insert results of executing commands retrieved from the submission queue(s) 122. In an illustrative embodiment, the host device 120 includes a submission queue and a completion queue for each processor core in each processor of the host device 120. The host device 120 may also include additional submission queues and completion queue, such as for controller administration/management.

In a particular embodiment, the data storage device 110 and the host device 120 use interrupt-driven communication. For example, to request that a command (e.g., read command) be executed, the host device 120 may insert the command into the submission queue(s) 122 and transmit a first interrupt 130 to the data storage device 110. The controller 114 may respond to the first interrupt 130 by retrieving one or more commands from the submission queue(s) 122 and executing the retrieved command(s). The data storage device 110 may store results (e.g., data, a completion code, an error code, etc.) of executing the command(s) in the completion queue(s) 124 and may send a second interrupt 136 to the host device 120 to indicate that execution of the command(s) has been completed.

During operation, the host device 120 may allocate host buffers (e.g., memory buffers) in the host memory 126 and generate a SGL 133 including the list of host buffers. The SGL 133 may specify physical memory locations in the host memory 126 that are designated for use by the data storage device 110 for data transfers. The host device 120 may also generate a read command 131 to be executed by the data storage device 110. The read command 131 may be inserted into the submission queue(s) 122 and the first interrupt 130 may be sent to the data storage device 110 to notify the data storage device 110 of the read command 131. In response to receiving the first interrupt 130, the controller 114 may retrieve the read command 131.

The read command 131 may include one or more parameters to enable the data storage device 110 to execute the read command 131. The read command 131 may pertain to data stored in the non-volatile memory 112 in either a continuous or a non-continuous fashion. For example, the read command 131 may include a starting logical block address (starting LBA), a number of logical blocks to be read (NLB), and a SGL pointer identifying a location 176 in the host memory 126 at which the SGL 133 is stored. The SGL 133 may identify which logical blocks are requested by the read command 131 (e.g., blocks that are to be transferred to the host device 120) and which logical blocks are not requested (e.g., blocks that are not to be transferred to the host device 120). In a particular embodiment, the starting LBA and the NLB identify a continuous set of logical blocks stored in the non-volatile memory 112 and the SGL 133 identifies a non-continuous subset of those logical blocks that the host device 120 has requested. It should be noted that NLB is a total number of logical blocks, and thus includes logical blocks that will be transferred to the host device 120 as well as "bit buckets" corresponding to logical blocks that will not be transferred to the host device 120.

In the illustrated example, the starting LBA is "x," NLB is 20, and the SGL pointer is $H_{SGL}$. Further, in the illustrated example, each logical block includes 512 bytes of data. Thus, NLB=20 corresponds to ten kilobytes (KBs) of data. In alternate embodiments, a different logical block size may be used. For purposes of illustration, the ten KBs of data are divided in FIG. 1 into four segments, a 2 KB (i.e., 4 logical blocks) segment, a 3 KB (i.e., 6 logical blocks) segment, 1 KB (i.e., 2 logical blocks) segment, and a 4 KB (i.e., 8 logical blocks) segment, respectively. As further described herein, in the illustrated example, the 1 KB segment is a bit bucket that is not to be transferred to the host device 120, whereas the remaining segments are to be transferred to the host device 120. To visually indicate this difference, the 1 KB segment is shown using a hatched pattern.

Upon receiving the read command 131, the controller 114 may send the read instruction 150 to the non-volatile memory 112. The read instruction 150 may instruct the non-volatile memory 112 to perform a read (e.g., pre-fetch) operation on a continuous region of the non-volatile memory and to temporarily store the pre-fetched plurality of logical blocks 152 in the read buffer 116. In the illustrated example, the plurality of logical blocks 152 starts at the starting LBA of "x" and includes NLB=20 logical blocks. After issuing the read instruction 150, the controller 114 may retrieve the SGL 133 from the host memory 126 using the SGL pointer (e.g., $H_{SGL}$). For example, the controller 114 may send a SGL request 132 to the host device 120 and may receive the SGL 133 from the host device 120 in response to the SGL request 132, as shown.

In a particular embodiment, the read operation on the non-volatile memory 112 may make up a relatively large percentage of an overall read latency of the data storage device 110. Thus, initiating the read/pre-fetch operation using the read instruction 150 prior to retrieving and processing the SGL 133 may decrease read latency, even if the read/pre-fetch operation includes reading logical blocks that have not been requested by the host device 120 (e.g., the 1 KB bit bucket shown in the hatched pattern).

In a particular embodiment, the SGL 133 includes a linked list of SGL segments describing host buffers, and the SGL segments are received by the controller 114 on a segment-by-segment basis. When the SGL 133 includes a linked list, the location 176 may correspond to a sequence of continuous or non-continuous locations in the host memory 126. Each SGL segment in the SGL 133 may include a segment descriptor and/or a bit bucket descriptor. A segment descriptor may describe a data segment to be transferred to the host device 120. For example, a segment descriptor may include a host memory address and a number of logical blocks to be transferred to a region of the host memory 126 that starts at the host memory address. A bit bucket descriptor may identify a number of logical blocks that follow a data segment but are not to be transferred to the host device 120 responsive to the read command 131. Each SGL segment in the linked list, other than the last and next-to-last SGL segments, may include a "next" pointer to a next SGL segment in the linked list. The next-to-last SGL segment may include a "last" pointer to the last SGL segment.

In FIG. 1, the SGL 133 includes a first SGL segment 162 (segment 0), a second SGL segment 164 (segment 1), and a third/last SGL segment 166 (segment 2). The first SGL segment 162 includes a segment descriptor having a first host memory address $H_1$ and a length of 2 KB, indicating that 2 KB of data (i.e., 4 logical blocks) are to be transferred by the controller 114 to a region 174 of the host memory 126 that starts at the first host memory address $H_1$. The first SGL segment 162 also includes a pointer (Next=Sgmt. 1) to the second SGL segment 164.

The second SGL segment 164 includes a segment descriptor having a second host memory address $H_2$ and a length of 3 KB, indicating that 3 KB of data (i.e., 6 logical blocks) are to be transferred by the controller 114 to a region 172 of the host memory 126 that starts at the second host memory address $H_2$. The second SGL segment 164 also includes a bit bucket descriptor indicating that the 1 KB of data that follows the 3 KB data segment (and is illustrated in FIG. 1 using hatching) is not to be transferred to the host device 120. The second SGL segment 164 further includes a pointer (Last=Sgmt. 2) to the third SGL segment 166. The third SGL segment 166 includes a segment descriptor having a third host memory address $H_3$ and a length of 4 KB, indicating that 4 KB of data (i.e., 8 logical blocks) is to be transferred by the controller 114 to a region 178 of the host memory 126 that starts at the third host memory address $H_3$.

After retrieving the SGL 133 from the host memory 126, or as individual segments 162-166 of the SGL 133 are retrieved, the controller 114 may traverse the SGL 133 to identify logical blocks that the controller 114 is to transfer to the host device 120 and bit buckets that the controller 114 is to refrain from transferring to the host device 120. In a particular embodiment, SGL retrieval and processing may occur while the read/pre-fetch operation on the non-volatile memory 112 is ongoing. Once the logical blocks 152 (or at least a portion thereof) become available in the read buffer 116, the controller 114 may begin transferring logical blocks to the host device 120. For example, the controller 114 may "skip over" or "ignore" the bit buckets in the read buffer 116 and may transfer the remaining subset 134 of logical blocks from the read buffer 116 to the host device 120. To illustrate, as shown in FIG. 1, the controller 114 may transfer (e.g., copy) the 3 KB data segment to the region 172, the 2 KB data segment to the region 174, and the 4 KB data segment to the region 178.

After the subset 134 of logical blocks is transferred, the controller 114 may insert a completion command 135 into the completion queue(s) 124 and send the second interrupt 136 to the host device 120 to indicate that the data segments have been written to the host memory regions 172, 174, and 178. In an illustrative embodiment, the completion command 135 includes a status code indicating whether the read command 131 succeeded or failed. If the read command 131 failed, the completion command 135 may indicate why the read command 131 failed (e.g., invalid memory address, invalid host buffer, etc.).

The system 100 of FIG. 1 may thus enable performing a read operation (or at least a portion thereof) on memory prior to retrieving a SGL that identifies specific requested logical blocks and/or bit buckets in the memory. Initiating a read/pre-fetch prior to retrieving the SGL may decrease read latency of a data storage device. It should be noted that although the foregoing describes execution of a NVMe read command, this is an example only and is not to be considered limiting. The described techniques may be used with other system environments in which executing a read command involves receiving additional information (e.g., a list of memory buffers, such as a SGL) from a host device. In accordance with the described techniques, host requested data (and bit buckets) may be read directly from non-volatile memory (e.g., NAND flash memory) by a controller before retrieving and processing the additional information (e.g., the SGL).

Figure 2:
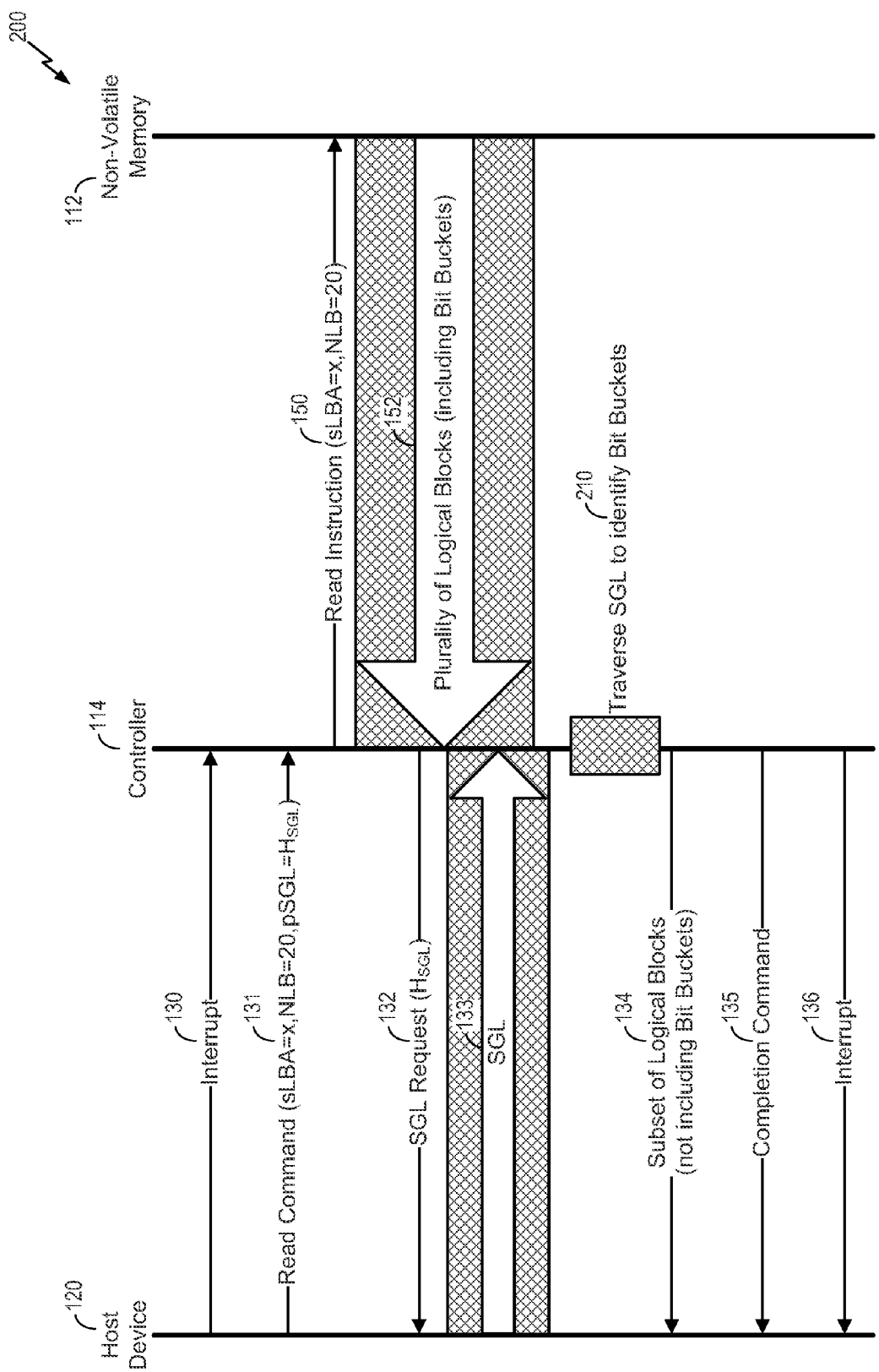
FIG. 2 is a timing diagram to illustrate operations that may be performed at the system of FIG. 1.

Referring to FIG. 2, a timing diagram 200 to illustrate operations that may be performed at the system 100 of FIG. 1 is shown. In FIG. 2, time proceeds from top-to-bottom.

As shown in FIG. 2, the host device 120 may send the interrupt 130 to the controller 114. In response to the interrupt 130, the controller 114 may receive the read command 131 from the host device 120. For example, the controller 114 may retrieve the read command from a submission queue 122 on the host device 120. The controller 114 may issue the read instruction 150 to the non-volatile memory 112, and the non-volatile memory 112 may begin providing the plurality of logical blocks 152 to the controller 114. After sending the read instruction 150 to the non-volatile memory 112, the controller 114 may send the SGL request 132 to the host device 120 and may receive the SGL 133 from the host device 120. Thus, a first time period corresponding to the read/pre-fetch operation on the non-volatile memory 112 begins before a second time period corresponding to retrieving the SGL 133. A portion of the first time period may overlap with a portion of the second time period. Alternately, the time periods may be non-overlapping.

Advancing to 210, the controller 114 may traverse the SGL to identify bit buckets to refrain from transferring to the host device 120. In some embodiments, a third time period corresponding to traversing the SGL may overlap with part of the first time period and/or part of the second time period. The controller 114 may then transfer the subset 134 of logical blocks (not including bit buckets) to the host device 120, insert the completion command 135 into a completion queue 124, and send the second interrupt 136 to the host device 120.

As illustrated in FIG. 2, the read operation on the non-volatile memory 112 may be initiated prior to receiving the SGL 122 from the host device 120. Initiating the read operation prior to retrieving the SGL 133 may decrease read latency of the data storage device 110.

Figure 3:
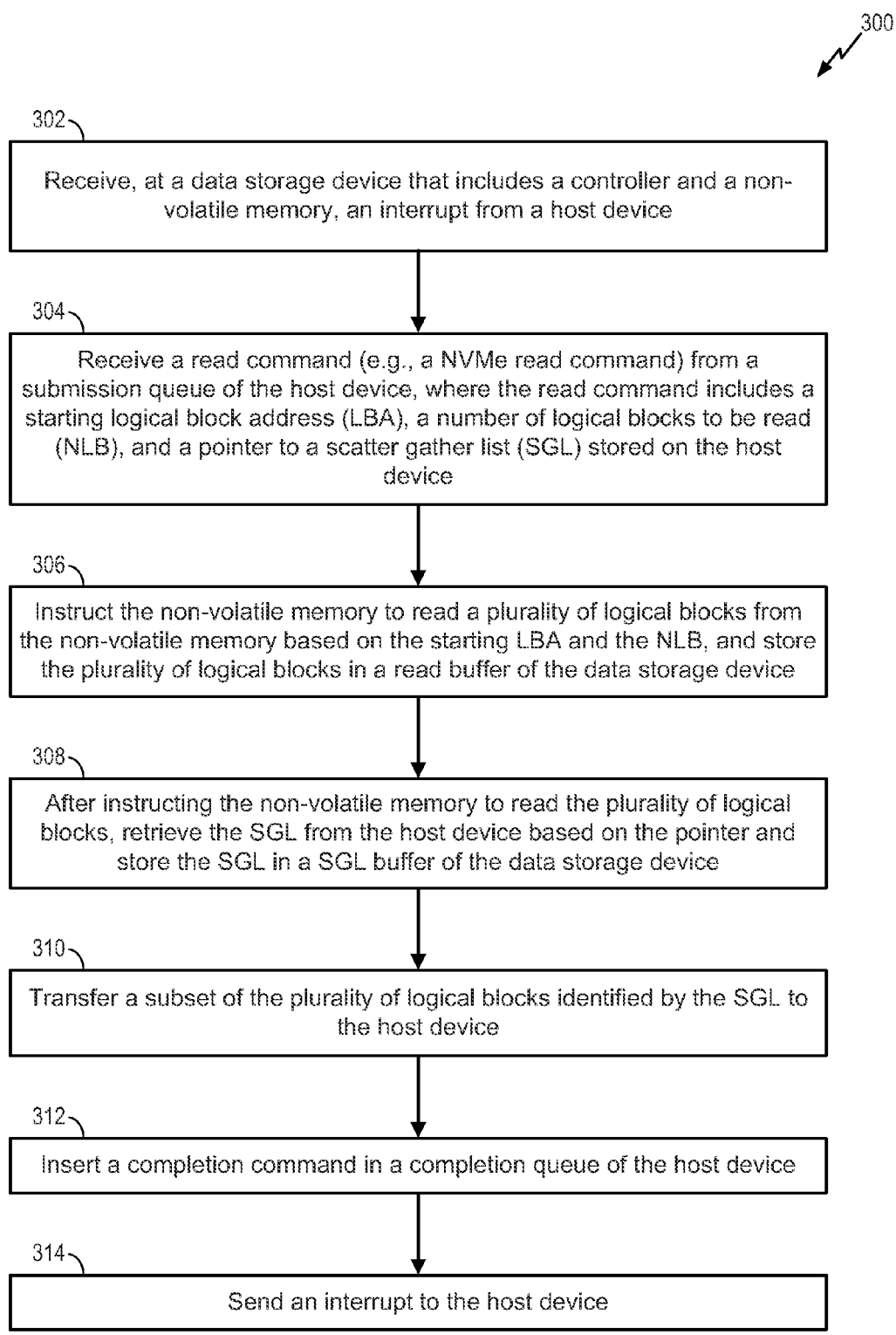
FIG. 3 is a flow chart of a particular embodiment of a method of initiating a read operation prior to retrieval of a SGL.

Referring to FIG. 3, a flowchart of a particular embodiment of a method 300 of performing a read operation that includes initiating a read of data prior to retrieval of a SGL is shown. In an illustrative embodiment, the method 300 may be performed by the data storage device 110 of FIG. 1.

The method 300 includes receiving an interrupt at a data storage device, at 302. The interrupt is received from a host device. The data storage device includes a controller and a non-volatile memory. For example, referring to FIG. 1, the data storage device 110 may receive the first interrupt 130 from the host device 120.

The method 300 also includes receiving a read command (e.g., a NVMe read command) from a submission queue of the host device, at 304. The read command includes a starting logical block address (LBA), a number of logical blocks to be read (NLB), and a pointer to a scatter gather list (SGL) stored on the host device. For example, referring to FIG. 1, the controller 114 may retrieve the read command 131 from the submission queue(s) 122, where the read command 131 includes the starting LBA="x," NLB=20, and the SGL pointer $H_{SGL}$.

The method 300 further includes instructing the non-volatile memory to read a plurality of logical blocks from the non-volatile memory device based on the starting LBA and the NLB, and to store the plurality of logical blocks in a read buffer of the data storage device, at 306. For example, referring to FIG. 1, the controller 114 may issue the read instruction 150 to the non-volatile memory 112 and a plurality of logical blocks 152 may be stored in the read buffer 116.

The method 300 includes, after instructing the non-volatile memory to read the plurality of logical blocks, retrieving the SGL from the host device based on the pointer and storing the SGL in a SGL buffer of the data storage device, at 308. For example, referring to FIG. 1, after issuing the read instruction 150, the controller 114 may retrieve the SGL 133 and store the SGL 133 in the SGL buffer 118. The SGL 133 may include one or more SGL segments, such as the illustrative SGL segments 162-166.

The method 300 also includes transferring a subset of the plurality of logical blocks to the host device, at 310. For example, referring to FIG. 1, the controller 114 may transfer the subset 134 of logical blocks identified by the SGL 133 to the host device 120 and may refrain from transferring the 1 KB bit bucket shown in FIG. 1 using a hatched pattern.

The method 300 further includes inserting a completion command in a completion queue of the host device, at 312, and sending an interrupt to the host device, at 314. For example, referring to FIG. 1, the controller 114 may insert the completion command 135 into the completion queue(s) 124 and may send the second interrupt 136 to the host device 120.

It should be noted that in alternate embodiments, some of the steps shown in FIG. 3 may be combined or the time periods associated with performing certain steps may overlap. For example, as described with reference to FIG. 2, the SGL may be retrieved while the non-volatile memory is performing the read/pre-fetch operation. In alternate embodiments, one or more of the steps shown in FIG. 3 may be omitted or may be performed in a different order than illustrated.

The method 300 of FIG. 3 may thus enable performing a read operation (or at least a portion thereof) on memory prior to retrieving a SGL that identifies specific requested logical blocks and/or bit buckets in the memory. Initiating the read/pre-fetch prior to retrieving the SGL may decrease read latency of a data storage device.

Although various components depicted herein are illustrated as block components and described in general terms, such components may include one or more microprocessors, state machines, or other circuits configured to enable the controller 114 to initiate a read prior to retrieving a SGL.

The controller 114 may be implemented using a microprocessor or microcontroller programmed to initiate a read prior to retrieving a SGL. In a particular embodiment, the controller 114 includes a processor executing instructions that are stored at the non-volatile memory 112. Alternatively, or in addition, executable instructions that are executed by the processor may be stored at a separate memory location that is not part of the non-volatile memory 112, such as at a read-only memory (ROM) or a random access memory (RAM).

In a particular embodiment, the data storage device 110 may be attached or embedded within one or more host devices, such as within a housing of a host communication device. For example, the data storage device 110 may be embedded within a packaged apparatus such as a wireless telephone, a personal digital assistant (PDA), a gaming device or console, a portable navigation device, or other device that uses internal non-volatile memory. However, in other embodiments, the data storage device 110 may be implemented in a portable device configured to be selectively coupled to one or more external devices.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   in a data storage device that includes a controller and a non-volatile memory, performing by the controller:
      receiving a read command from an accessing device, wherein the read command includes a starting logical block address (LBA) of the non-volatile memory, a number of logical blocks to read (NLB), and a pointer to a scatter gather list (SGL);
      instructing the non-volatile memory to read a plurality of logical blocks from the non-volatile memory based on the starting LBA and the NLB;
      after instructing the non-volatile memory to read the plurality of logical blocks, retrieving the SGL based on the pointer; and
      transferring a subset of the plurality of logical blocks to the accessing device based on the SGL, wherein the SGL identifies at least one logical block, and wherein transferring the subset of the plurality of logical blocks comprises transferring at least one of the plurality of logical blocks, other than the at least one logical block, to the accessing device.

2. The method of claim 1, wherein the non-volatile memory comprises a NAND flash memory.

3. The method of claim 1, wherein the plurality of logical blocks includes a continuous set of logical blocks.

4. The method of claim 1, wherein the SGL identifies a memory address of the accessing device and a number of logical blocks to transfer.

5. The method of claim 1, wherein the SGL includes a plurality of segments, wherein each segment of the plurality of segments identifies one or more of a memory address of the accessing device, a number of logical blocks to transfer, a number of logical blocks to refrain from being transferred to the accessing device, a next segment of the plurality of segments, or a last segment of the plurality of segments.

6. The method of claim 1, wherein receiving the read command comprises receiving an interrupt from the accessing device and retrieving the read command from a submission queue of the accessing device in response to the interrupt.

7. The method of claim 1, further comprising storing the plurality of logical blocks in a read buffer of the data storage device.

8. The method of claim 1, wherein transferring the subset of the plurality of logical blocks to the accessing device comprises inserting a completion command in a completion queue of the accessing device and sending an interrupt to the accessing device.

9. The method of claim 1, further comprising storing the SGL in a SGL buffer of the data storage device.

10. The method of claim 1, wherein the read command comprises a non-volatile memory express (NVMe) command.

11. A data storage device comprising:
a non-volatile memory; and
a controller coupled to the non-volatile memory, wherein the controller is configured to:
receive a read command from an accessing device, Wherein the read command includes a starting logical block address (LBA) of the non-volatile memory, a number of logical blocks to read (NLB), and a pointer to a scatter gather list (SGL);
instruct the non-volatile memory to read a plurality of logical blocks from the non-volatile memory based on the starting LBA and the NLB;
after instructing the non-volatile memory to read the plurality of local blocks, retrieve the SGL based on the pointer; and
transfer a subset of the plurality of logical blocks to the accessing, device based on the SGL, wherein the SGL identifies at least one logical block, and wherein the controller is configured to transfer the subset of the plurality of logical blocks by transferring at least one of the plurality of logical blocks, other than the at least one logical block, to the accessing device.

12. The data storage device of claim 11, wherein the non-volatile e memory comprises a NAND flash memory.

13. The data storage device of claim 11, wherein the plurality of logical blocks includes a continuous set of logical blocks.

14. The data storage device of claim 11, wherein the SGL identifies a memory address of the accessing device and a number of logical blocks to transfer.

15. The data storage device of claim 11, wherein the SGL includes a plurality of segments, wherein each segment of the plurality of segments identifies one or more of a memory address of the accessing device, a number of logical blocks to transfer, a number of logical blocks to refrain from being transferred to the accessing device, a next segment of the plurality of segments, or a last segment of the plurality of segments.

16. The data storage device of claim 11, wherein the controller is further configured to:
receive an interrupt from the accessing device; and
retrieve the read command from a submission queue of the accessing device in response to the interrupt.

17. The data storage device of claim 11, further comprising a read buffer, wherein the controller is further configured to store the plurality of logical blocks in the read buffer.

18. The data storage device of claim 11, wherein the controller is further configured to:
insert a completion command in a completion queue of the accessing device; and
send an interrupt to the accessing device.

19. The data storage device of claim 11, further comprising a SGL buffer, wherein the controller is further configured to store the SOL in the SGL buffer.

20. The data storage device of claim 11, wherein the read command comprises a non-volatile memory express (NVMe) command.

* * * * *

UNITED STATES PATENT AND TRADEMARK OFFICE
CERTIFICATE OF CORRECTION

PATENT NO.        : 9,110,786 B2
APPLICATION NO.   : 14/074497
DATED             : August 18, 2015
INVENTOR(S)       : Marcus Allan Carlson et al.

Page 1 of 1

It is certified that error appears in the above-identified patent and that said Letters Patent is hereby corrected as shown below:

In the Claims,

Claim 11 (Column 9, Line 43) "plurality of local blocks, retrieve the SGL based on the" should be --plurality of logical blocks, retrieve the SGL based on the--.

Claim 11 (Column 10, Line 2) "accessing, device based on the SGL, wherein the SGL" should be --accessing device based on the SGL, wherein the SGL--.

Claim 12 (Column 10, Line 9) "volatile e memory comprises a NAND flash memory." should be --volatile memory comprises a NAND flash memory.--.

Claim 19 (Column 10, Line 39) "store the SOL in the SGL buffer." should be --store the SGL in the SGL buffer.--.

Signed and Sealed this
Thirty-first Day of May, 2016

Michelle K. Lee
*Director of the United States Patent and Trademark Office*